United States Patent [19]

Medlin

[11] 4,049,166

[45] Sept. 20, 1977

[54] CLAMP APPARATUS

[76] Inventor: William K. Medlin, 2406 Victoria Ave., Ann Arbor, Mich. 48104

[21] Appl. No.: 684,732

[22] Filed: May 10, 1976

[51] Int. Cl.² ............................................. B60R 11/00
[52] U.S. Cl. ................................ 224/42.1 G; 248/500; 280/414 R
[58] Field of Search ........................ 224/42.1 E, 42.1 F, 224/42.1 R, 42.1 B, 42.1 G, 42.45 R, 29 R; 280/414 R, 414 A, 179 R; 248/500, 503

[56] References Cited

U.S. PATENT DOCUMENTS

| 2,895,705 | 7/1959 | Maham | 280/414 R |
|---|---|---|---|
| 3,109,569 | 11/1963 | Hare | 224/42.1 F |
| 3,343,503 | 9/1967 | Johnson | 280/179 A X |
| 3,960,301 | 6/1976 | Miller | 224/42.1 R |

FOREIGN PATENT DOCUMENTS

| 139,168 | 10/1950 | Australia | 224/42.1 G |
|---|---|---|---|
| 1,488,439 | 6/1967 | France | 224/42.1 E |

Primary Examiner—Robert J. Spar
Assistant Examiner—Jerold M. Forsbeg
Attorney, Agent, or Firm—Finn G. Olsen

[57] ABSTRACT

A clamp for securing a boat with integral oarlock receptacles in an inverted position on the roof of a motor vehicle. The clamp apparatus includes a bolt member that is positioned in an oarlock receptacle, a clamp assembly that can be releasably secured to the motor vehicle's rain gutter or other latching part and extensible and contractible coupling means which extends between and is connected to the bolt member and the clamp assembly. The coupling means can be contracted to draw the bolt member toward the clamp assembly thereby to secure the boat to the roof.

5 Claims, 4 Drawing Figures

U.S. Patent  Sept. 20, 1977  4,049,166
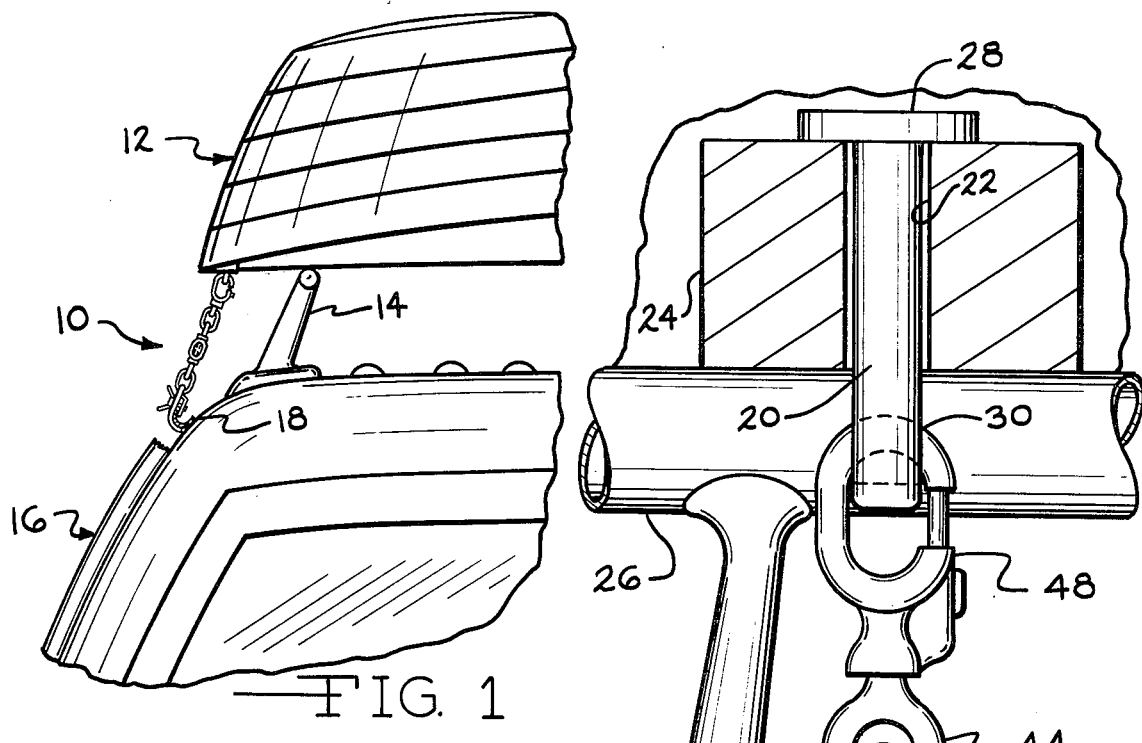
FIG. 1
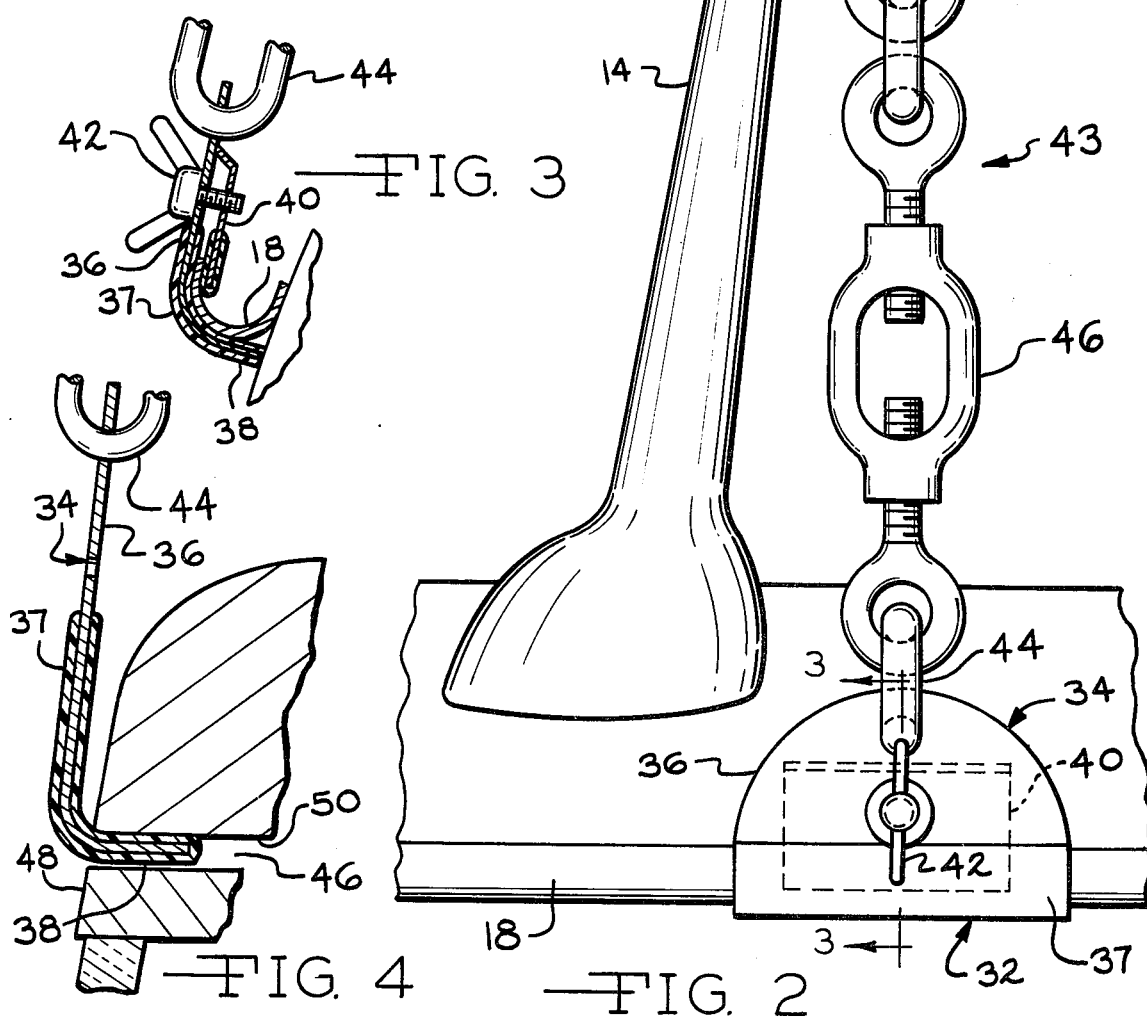
FIG. 3
FIG. 4
FIG. 2

CLAMP APPARATUS

BACKGROUND OF THE INVENTION

The present invention relates generally to anchoring apparatus and more specifically to clamp apparatus for securing an inverted boat to the roof of a motor vehicle. Motor vehicles can be provided with roof carriers for the purpose of carrying large objects that cannot adequately fit inside the vehicle. These carriers have been widely used for transporting small water vessels such as fishing boats. When secured in the ordinary manner, the bow and stern of the boat are tied to the front and rear of the motor vehicle, respectively. However, it is still possible that a strong crosswind or air turbulence created by a passing truck can force the boat sideways off the roof of the motor vehicle. The present invention solves this problem by providing clamp apparatus that connects the sides ot the boat to the motor vehicle.

SUMMARY OF THE INVENTION

One form of the present invention comprises clamp apparatus that includes a bolt member having an enlarged head at one end and an eyelet opening at the other end for positioning in one of the oarlock receptacles or other rig-pieces of the boat, a clamp assembly for releasably attaching to the motor vehicle, and extensible and contractible coupling means comprising a turnbuckle device and a snap ring for extending between and connecting the bolt member to the clamp assembly. The snap ring is attached to the bolt through its eyelet opening after the bolt has been positioned in the oarlock or other suitable receptacle. The clamp assembly consists of a bent plate member which engages the rain gutter. A brace member on the clamp assembly is tightened against the interior of the rain gutter thereby to fasten the clamp assembly to the rain gutter. The turnbuckle device is operable to draw the bolt member toward the clamp assembly thereby securing the boat on the roof. In a modified form of the invention, the clamp assembly is adapted to engage the door frame, or other suitable structure of the vehicle.

It is thus the object of the present invention to provide an improved clamp apparatus for securing an inverted boat to the roof of a motor vehicle.

Further objects, features and advantages of the present invention will become apparent from a consideration of the following description when taken in connection with the appended claims and the attached drawing in which:

FIG. 1 is a partial front view showing an inverted boat secured to the roof of a motor vehicle by the clamp apparatus of the present invention; p FIG. 2 is an elevational view showing the clamp apparatus of the present invention;

FIG. 3 is a sectional view of the clamp assembly taken substantially from lines 3—3 in FIG. 2; and FIG. 4 is a sectional view, like FIG. 3, showing a modified form of the present invention.

DESCRIPTION OF THE PREFERRED EMBODIMENTS

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring to the drawing, the invention will be described in greater detail. The clamp apparatus 10 of the present invention is shown in FIG. 1 securing an inverted boat 12 to a carrier support 14 positioned on the roof of a motor vehicle 16. More specifically, the clamp apparatus 10 is shown connecting the side of the boat 12 to a rain gutter 18 of the motor vehicle 16.

The clamp apparatus 10 (FIG. 2) comprises first attachment means such as the bolt 20 which is positioned in an oarlock receptacle 22 that is formed through an outrigger 24 which is secured along the boat gunwale 26. The bolt 20 has an enlarged head 28 at one end and an eyelet opening 30 at the other end. The bolt 20 is positioned in the oarlock receptacle 22 to extend downwardly therethrough so that the eyelet opening 30 is positioned below the outrigger 24.

The clamp apparatus 10 also includes second attachment means that consists of a clamp assembly 32 that can be releasably secured to the motor vehicle. As shown in FIG. 2, the clamp assembly 32 is secured to the rain gutter 18 of the motor vehicle 16. The clamp assembly 32 comprises a plate member 34 having an upright portion 36 and a transverse portion 38 (FIG. 3). The plate member 34 is operable to engage the rain gutter 18 and a brace member 40 is provided to secure the clamp assembly 32 to the rain gutter 18. Flexible material such as plastic 37 covers the portion of the plate 34 and the brace member 40 that contact the vehicle to increase friction and protect the finish of the motor vehicle. A wing nut assembly 42 threadably engages the brace member 40 to urge it against the interior surface of the gutter 18 to securely maintain the clamp assembly 32 on the rain gutter 18.

Extensible and contractible coupling means 43 is provided and extends between and is connected to the bolt 20 and the clamp assembly 32. The coupling means 43 comprises interconnected chain links 44, a turnbuckle device 46 and fastening means in the form of a snap ring 48. The snap ring 48 releasably engages the bolt member 20 through the eyelet opening 30. The turnbuckle device 46 functions to draw the bolt 20 and the clamp assembly 32 together to secure the boat 12 on the roof of the motor vehicle 16.

A modified form of the present invention is shown in FIG. 4 wherein the clamp assembly 32 is shown positioned in the gap 46 that exists between the door 48 and the door frame 50 of the motor vehicle 16. In this form of the invention, the brace member 40 and wing nut 42 are not needed to secure the clamp assembly 32 to the motor vehicle and can be removed. They can be replaced whenever the clamp assembly 32 is used with a motor vehicle having a rain gutter 18. The plate member 34 and the flexible plastic 37 which covers it to protect the finish of the car are of a width such that the transverse portion 38 can be inserted in the gap 46 while maintaining sufficient rigidity to perform its latching function.

In operation, assume that the inverted boat 12 has been positioned on the roof of the motor vehicle 16 and its bow and stern have been secured to the front and back of the motor vehicle, respectively. The bolt 20 is inserted in the oarlock receptacle 22 so that the eyelet opening 30 extends downwardly below the outrigger 24. The enlarged head 28 insures that the bolt 20 will be maintained in the oarlock receptacle 22. The snap ring 48 is then inserted into the eyelet opening 30 and the clamp assembly 32 is positioned so that the transverse portion 38 engages the underside of the rain gutter 18. The clamp assembly 32 is then secured to the rain gutter 18 by tightening the wing nut 42 to urge the brace member 40 against the inside of the rain gutter 18 to secure the clamp assembly 32 thereto. The turnbuckle 46 is then tightened to draw the bolt 20 toward the clamp assembly 32, thus securing the boat 12 to the motor vehicle 16. A similar clamp apparatus 10 is likewise secured to the oarlock receptacle 22 on the other side of the boat 12 and rain gutter 18 respectively (not shown). In this manner, the possibility that cross winds or air turbulence would cause the boat to be disengaged from the roof of the motor vehicle 16 is minimized.

The modified form of the present invention enables the clamp assembly 32 to be inserted into the gap 46 between the door 48 and the door frame 50 of the motor vehicle 16. The same steps of attaching the clamp 10 to the boat and motor vehicle 16 are followed as are described above. The only difference being that the brace member 40 and wing nut 42 are removed since the angular construction of the plate 34 will enable the clamp assembly 32 to be securely maintained in position after the turnbuckle 46 has been tightened.

It can thus be seen that novel apparatus has been provided which enables a boat to be secured in the inverted position on a motor vehicle's roof. The apparatus consists of a bolt 20 that is positioned and extends downwardly from the oarlock receptacles 22, coupling means 43 including a snap ring 48 and a turnbuckle 46, and a clamp assembly 32 which is releasably attached to the motor vehicle 16. Once the bolt 20, snap ring 48 and clamp assembly 52 have been properly fastened together, the turnbuckle 46 is tightened to secure the boat to the rooftop carrier.

What is claimed:

1. Apparatus for securing an inverted boat with integral oarlock, or similar receptacles on the roof of a motor vehicle, said apparatus comprising a bolt for positioning in and extending downwardly from one of said receptacles, said bolt having an enlarged head at one end for supporting said bolt in said receptacle and an eyelet opening at the other end, a clamp assembly for detachably fastening to said motor vehicle, and extensible and contractible coupling means extending between and connected to said bolt and said clamp assembly, said clamp assembly including a member having an upright portion connected to said coupling means and a transverse portion for engaging said motor vehicle, said extensible and contractible coupling means including fastening means releasably connected to said bolt through said eyelet opening and a turnbuckle device operable when contracted to draw said bolt and said clamp assembly toward one another thereby to secure said boat on said roof.

2. Apparatus that is defined in claim 1 wherein said fastening means comprises a snap ring for releasably connecting said coupling means with said bolt.

3. Apparatus that is defined in claim 2 wherein said clamp assembly is operable for fastening to the rain gutter of a motor vehicle, said clamp assembly further including a brace member and tightening means, said transverse portion engaging the underside of said rain gutter and said brace member engaging the interior of said rain gutter being secured thereto by said tightening means to hold said clamp assembly in place.

4. Apparatus for securing a boat with integral oarlock receptacles in an inverted position on the roof of a motor vehicle, said apparatus comprising a bolt for positioning in and extending downwardly from one of said oarlock receptacles, said bolt having an enlarged head at one end for supporting said bolt in said receptacle and an eyelet opening at the other end, a clamp assembly for detachably fastening to said motor vehicle, and extensible and contractible coupling means extending between and connected to said bolt and said clamp assembly, said clamp assembly including a plate member having an upright portion connected to said coupling means and a transverse portion for engaging said motor vehicle, said extensible and contractible coupling means including a snap ring for releasably connecting to said bolt through said eyelet opening and a turnbuckle device operable when contracted to draw said bolt and said clamp assembly toward one another, thereby to secure said boat on said roof.

5. Apparatus that is defined in claim 4, wherein said clamp assembly is operable for fastening to the rain gutter of a motor vehicle, said clamp assembly further including a movable brace member for engaging the interior of the rain gutter and tightening means for urging said brace member into engagement with said rain gutter to thereby secure said clamp assembly thereto.

* * * * *